W. E. ANDREW.
RESILIENT TIRE.
APPLICATION FILED FEB. 23, 1912. RENEWED SEPT. 30, 1916.
1,265,032.
Patented May 7, 1918.
2 SHEETS—SHEET 1.
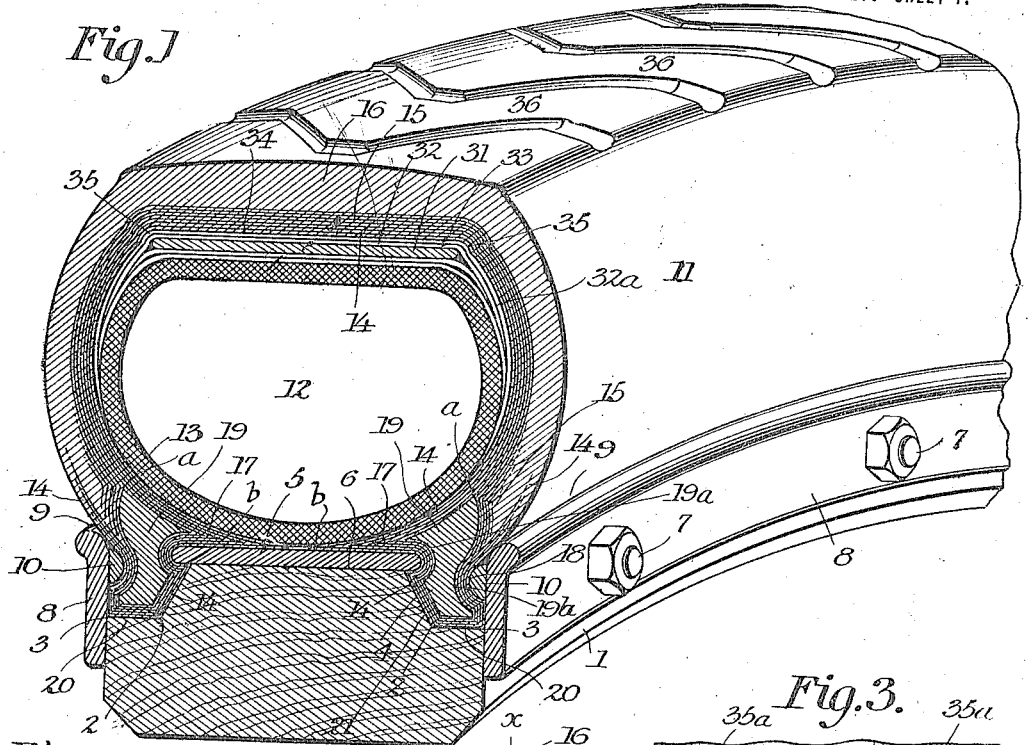
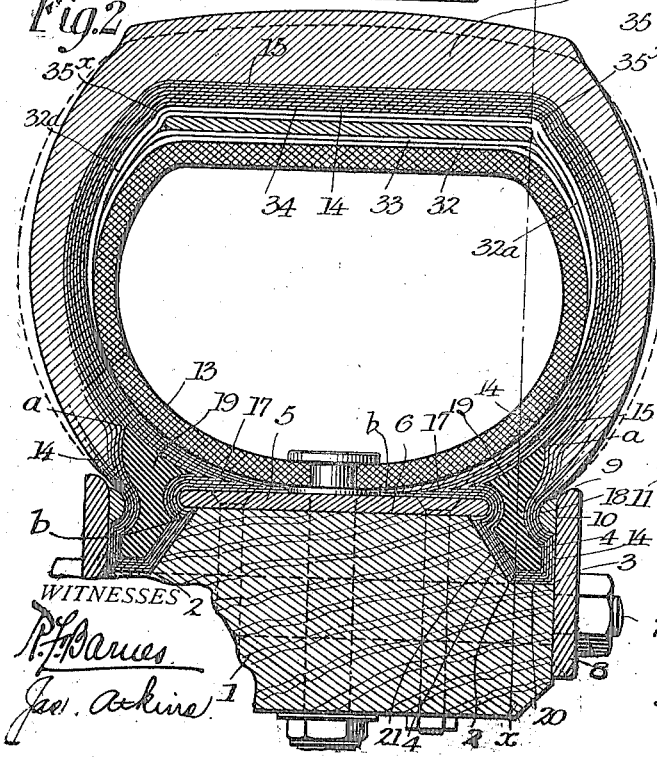
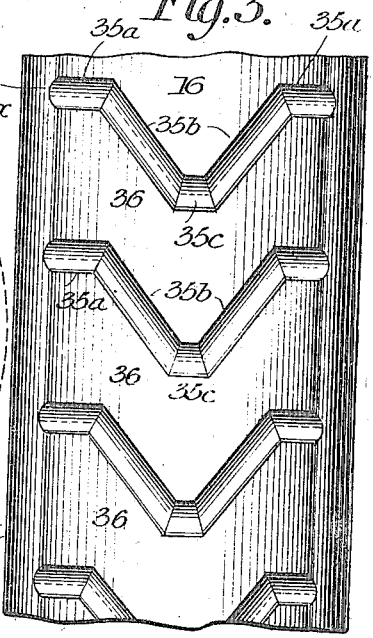
WITNESSES
INVENTOR
William E. Andrew,
by Edmund H. ___ Attorney

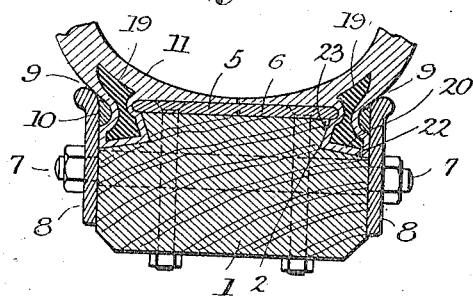 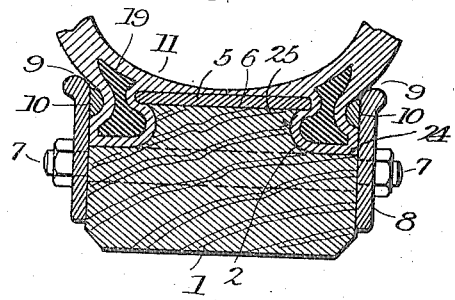
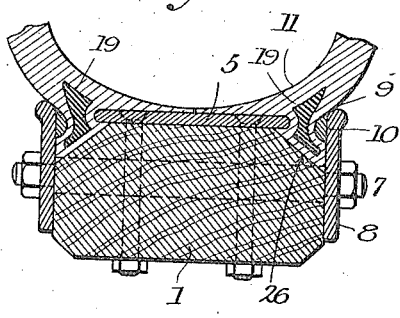 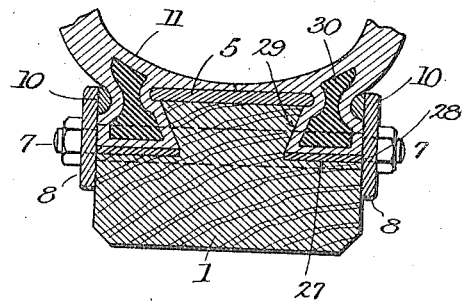
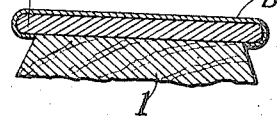 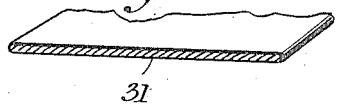 
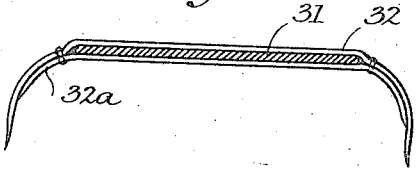 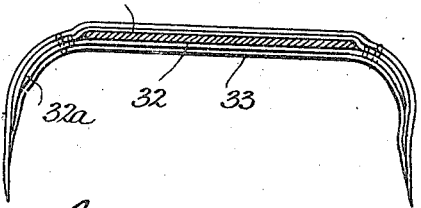

UNITED STATES PATENT OFFICE.

WILLIAM E. ANDREW, OF ATLANTIC HIGHLANDS, NEW JERSEY.

RESILIENT TIRE.

1,265,032.

Specification of Letters Patent.

Patented May 7, 1918.

Application filed February 23, 1912, Serial No. 679,338. Renewed September 30, 1916. Serial No. 123,128.

*To all whom it may concern:*

Be it known that I, WILLIAM E. ANDREW, a citizen of the United States, residing at Atlantic Highlands, in the county of Monmouth and State of New Jersey, have invented certain new and useful Improvements in Resilient Tires, of which the following is a specification, reference being had therein to the accompanying drawing.

My invention relates to vehicle tires and particularly to the class thereof which embraces pneumatic tires.

A primary object of my invention is to produce a structure which is practically puncture and leakage-proof.

Another object of the invention is to construct a pneumatic tire which includes certain components of comparatively simple form but adapted to be aggrouped on a wheel with great facility; and, which when once secured to the felly of the wheel, is maintained thereon not only firmly but in a manner that will prevent rim-cutting, now a common defect in tires on the market.

The present invention is, in one aspect, an improvement upon the structure disclosed in United States Letters Patent granted to me on November 14th, 1911, as No. 1,008,772: The present structure includes certain of the components disclosed in said patent; and the improvement resides principally in certain features, among which is the particular manner of securing the tire-shoe to the felly. An important difference between the present structure and that of the patent is that, in lieu of employing a supplemental ring to be attached to the felly and which is housed largely within the shoe, I continue the felly itself up into the inner portion of the tire and thus obviate the use of a supplemental ring. Another important difference is that the present construction is, as distinguished from my patented pneumatic tire, essentially not of the clencher type; wherefore, the surface of the felly to which the shoe is to be attached may be of large dimensional area, thereby producing a greater bearing-surface for the shoe and giving it a load-carrying capacity. In consequence, a greater load and strain can be borne, and an enlarged air-capacity is rendered possible without necessity of enlarging the exterior of the shoe, and this is due to the fact that the heel of the tire is materially spread, in cross-section.

By reason of these advantageous features of difference, with the advantages which accrue therefrom, my present tire has a wider range of use, and its durability is, I find, considerably increased.

With these and other objects in view, the invention resides, in one aspect, in the following components aggrouped in a manner to be explained more in detail presently, but which components consist principally of a felly, a felly-band suitably mounted upon the shoe-engaging surface of the felly, and bands or plates suitably secured to the felly and provided with shoe-holding enlargements or projections, a shoe having a tread of broad ground-contacting surface and relatively reduced between the tread and the portion or portions secured to the felly and so formed as to provide a chamber of great air-carrying capacity, and means for attaching the shoe to the felly.

The invention resides, further, in the novel combination and arrangement of the parts, in their peculiar form and construction, and in the means for maintaining them in proper operative relation, all as more fully hereinafter described and claimed.

In the accompanying drawings, which are intended to illustrate, to those skilled in the related art, some of the many possible utilizations of my invention, it being manifest that other possible utilizations and embodiments which employ the underlying principles of my invention and falling within the spirit thereof and the objects contemplated thereby may be adopted.

Figure 1 is a view in perspective of a section of a tire illustrative of one embodiment of my invention;

Fig. 2 is a view in vertical section of the same on a somewhat larger scale;

Fig. 3 is a fragmentary view in plan, more particularly illustrating the form of the tread-surface of the shoe;

Figs. 4, 5, 6 and 7 show several modifications of the structure, these modifications residing, principally, in the form of the base of the shoe and the form of the felly with which the shoe-base engages and is held;

Fig. 8 is a fragmentary view in perspective, partly in section, of the yielding tread-band;

Fig. 9 is a fragmentary view, in vertical section, illustrating a modified form of the tread-band shown in position in the tread-portion of the shoe;

Fig. 10 is a similar view illustrative of a modified form of the tread-band; and Fig. 11 is a fragmentary view, in vertical section, of the felly and a portion of the felly band with an asbestos-fabric band-cover; and Fig. 12 is a similar view showing the asbestos-fabric band-cover extending around the edges of the felly band.

Referring to the drawings, and particularly to the embodiment thereof illustrated in Figs. 1, 2 and 3, the numeral 1 designates a felly of the vehicle-wheel which preferably is of wood, though, for my purposes, it may be constructed of any other appropriate material.

The felly is preferably and as shown of greater width than thickness. Preferably, and as shown, the shoe-engaging portion of the felly is, at each side, formed with a circumferential incut 2 to provide a transverse bearing-surface 3 and an angular contact-surface 4, the function of each of which surfaces will be presently explained.

On the outer surface of the felly, and held on said felly in any desirable manner which will insure its being firmly secured thereto, is a felly-band 5, which preferably, and as shown, is of a width greater than the band-engaging surface 6 of the felly.

Suitably secured, as by bolts 7, to each side of the felly is a side-band or plate 8, the upper portion of which extends somewhat above the bearing-surface 3 and to a point where its upper edge will be approximately in alinement with the felly-band 5. These plates, are, on their inner upper portion, as at 9, preferably rounded outwardly.

Disposed to engage the inner face of the upper portion of the side-band 8, and intermediate of its upper edge and the bearing-surface 3, is a half-round ring 10. If desired, this ring may be formed as a single element, or in sections. I prefer to make it separate from and non-integral with the plate 8; but it is within the sprit of my invention to form said ring as shown and to secure the same to the plate 8 in any suitable manner.

Adapted to be secured, in a manner presently to be described, upon the felly 1 is a shoe 11. Preferably, and as shown, this shoe is, in cross-section, of relatively greater width than is its height, whereby an approximately elliptical form of chamber 12 is formed, and within which any preferred form of air-tube 13 is housed.

The shoe is fabricated in a particular manner, as I shall now describe: In the first place, it comprises a plurality of layers of fabric embedded in the rubber, arranged in two or more groups 14 and 15. These fabric-layers extend, say, across the tread-portion 16 of the shoe; thence downwardly and at a particular point, as at $a$, are divided, the group marked 14 forming the inner wall of the shoe, and extending inwardly toward the center to form an inwardly projecting brace portion 17, said brace-portion, on each side, extending to within a short distance of the center of the plate 5, as shown. I may, however, so form the brace-portion 17 at each side as to permit the sections to be united or overlapped at the center when in position on the felly-band 5. The fabric-layers 14 continue along and around the edges of the felly-band 5 and downwardly and parallel with the angular or inclined contact-surface 4; thence outwardly and parallel with the bearing-surface 3; thence upwardly, the fabric being curved to form a concavity 18 to receive the ring 10, and whereby the base of the shoe is engaged; this structurally forming a holding device for the shoe. The said group of fabric-layers 14 continue upwardly and end in the rubber at a point somewhat removed from the upper end of the side-plate 8. The outer group of layers, 15, extend downwardly to form the outer wall of the shoe and, at the point $a$, extend downwardly on the inside of the other group 14; thence upwardly in parallel relation to the contact-surface 4, around the felly-band 5, and end in the rubber above said band 5.

Formed in the base-portion, between the layers 14 and 15, below the point at which they divide at $a$, is a circumferentially-extending strip 19 of hard but not necessarily non-yielding material. This strip—and it will be understood, of course, that there is one at each side of the shoe—serves to strengthen the base-portion of the shoe and, also, to form a rigid holding portion disposed between the felly-band 5 and the ring 10. To this end, the strips 19 are preferably provided with a circumferential-groove 19$^a$ on their inner side, and with a curved surface 19$^b$ toward their lower outer edge adjacent the rings 10.

From the foregoing, it will now be seen, that the lowermost portion 20 of the base of the shoe rests flatly upon the bearing-surface 3 formed in the felly, as aforementioned; that the portion 21 is inclined to bear upon the angular contact-surface 4; and that the portion of the base which extends beneath the felly-band 5 engages it and is thereby further maintained in position, the brace-portion 17 overlying and resting upon the band 5 which, thus, forms a support therefor.

As will be obvious by reference to Figs. 1 and 2, the brace-portions 17, by reason of the fact that they present a large contacting-surface against the felly-band, and as they extend nearly, if not entirely to each other, constitute a protector for the lower portion of the air-tube; furthermore, they perform the dual function of supporting a portion of the shoe upon the felly; and, moreover, they serve as the principal support for the shoe and act, also, as an abutment for the shoe, by engaging the band 5, in the event that the line of strain on the tire be at an angle to a line drawn vertically through the central portion of the felly and tire, and relieves the lower part of the base-portion from strain. This lower part serves principally, in conjunction with the rings and other described parts, as the holding portion for the tire. The felly-band 5, by reason of the fact that its edges project beneath said brace-portion 17 and somewhat into the body of the base-portion, constitutes a holding device for the shoe, also.

In Figs. 4, 5, 6, and 7, the holding and supporting-portions of the felly and shoe are illustrated in somewhat modified form, and these modifications will now be briefly described:

Referring to Fig. 4, it will be seen that the felly, instead of being formed with an incut having a laterally extending bearing-surface and an inwardly-inclined contacting-surface, as shown in Fig. 1, is provided with an inwardly-inclined bearing-surface 22 and with an upper outwardly-extending contacting-surface 23. The fabricated part of the base-portion of the shoe is similarly formed as in Fig. 1. In this instance, the contacting-surface 23, by reason of its angle, serves as an additional holding surface.

In Fig. 5, the incut 2 in the upper portion of the felly presents a laterally extending flat surface 24 and a rounding contacting-surface 25 which, by reason of its contour, will serve much the same purpose as the angularly-formed incut 2 in Fig. 2. The fabricated portion of the shoe is, in this instance, as in Fig. 4, substantially the same as described with reference to Fig. 1.

In Fig. 6, the felly is not formed with the incut 2 of Fig. 1 but the upper portion of said felly is provided with an inwardly-extending contacting-surface 26 which, by reason of the fact that its upper portion is somewhat further removed from the edges of the felly-band 5, forms, with said band, a holding as well as a contacting-surface. In this instance, as in the others already explained, the fabricated portion of the base of the shoe substantially corresponds with that in Fig. 1.

In Fig. 7, the modification is somewhat more radical, in that the incuts in the upper portion of the felly are more pronounced to provide a wide bearing surface 27 upon which an auxiliary felly-band 28 is applied. The incut also presents an upwardly and outwardly-inclined contacting-surface, 29, as shown. In this instance, the hard reinforcing circumferential strip 30 is relatively larger than those in the other embodiments. Moreover, the rings 10 are preferably disposed at or adjacent to the upper end of the side-plates 8 and practically in alinement with the main felly-band 5. This embodiment is of such form that it has the necessary attributes of the so-called "clencher" type of tire, and, in consequence, a clencher form of tire, of ordinary construction, could be utilized in connection with this embodiment.

It is a feature of my construction that the tread-portion 16 of the shoe is of substantial width and thickness and for the following reasons: In the first place I desire to have it present a broad ground-contacting surface, and in substantial parallelism with the supporting-surface of the felly-band 5 and the bearing-surface 3 of the circumferential incut in the felly. In other words, it is a desideratum of my invention to maintain the tread-portion of the shoe at all times substantially parallel with the supporting-surface of the felly-band 5 and the bearing-surface 3, whereby a supporting-surface for the entire shoe of relatively great dimensional area is presented. As a medium to maintain the tread-portion in a substantially uniform condition while in contact with the ground, and also to protect not only the tread-portion against puncture but also to protect the air-tube 13, I interpose between said air-tube and the tread-portion 16 a band 31 of appropriate and yielding material, such as steel or the like. Preferably, and as shown, the band 31 is of substantial width and greater than that of the felly-band 5. Its thickness will be governed by the consideration of the amount of resiliency which the tire is to have and, also, of the weight. The band 31 is preferably incased in a fabric 32. For reasons presently to be explained, I may, in some instances, surround the band 31—either with its covering 32 or without this—with an envelop 33 of asbestos or the like. This is to protect the entire structure from the heat which may be absorbed by the metal of the band 31, wherefore not only the surface which is engaged by the band 31 but the inner tube 15 is prevented from being affected by the heat of the band.

Embracing the felly band 5 and interposed between its upper surface and the air-tube 13 is a cover $b$ (Figs. 11 and 12) of non-conducting material, such as asbestos. By this cover $b$ the lower part of the tire structure, and particularly the inner tube 13, is protected from the heat which may be absorbed by and radiating from the metal of the felly band 5.

The casing or covering 32 of the tread-band 31 is preferably stitched or otherwise secured contiguous at the edges of the band and extends somewhat beyond the stitching so as to provide side-extensions $32^a$ adapted to extend along the inner walls of the shoe and constituting a protector for the air-tube 13, as shown in Fig. 1. I may, as shown in Fig. 10, form the extensions $32^a$ so as to extend a considerable distance down the inner walls of the shoe and may, if desired, continue the same down to the brace-portions 17.

To receive the band 31, the tread-portion 16 of the shoe is provided with a flat inner surface 34 and with side-grooves $35^x$. The band is of such dimensions, both widthwise and circumferentially, that it will, by its resiliency, be held firmly seated at all times in the position in the shoe thus provided for its reception. By this arrangement, the tread-band 31 is confined, and, by reason of its position within the shoe and its strength, it is adapted to support the tread-portion of the shoe in normal condition even in the event that there be no air within the chamber 12. The band, therefore, has several functions. In addition to those already stated, it has the important function of maintaining the tread-portion in a substantially rigid form so that the ground-contacting surface of the tread is maintained in proper parallel relation at all times with the felly-band 5 and with the bearing-surface 3 of the felly 1; hence, any angular contact with the ground-surface will not distort the broad ground-contacting surface of the tread, but, on the contrary, the band will maintain this at all times in a substantially flat condition with respect to the band, that is in a uniform surface-condition. Preferably, and as shown, the thinnest portion of the shoe, in cross-section, is practically midway between the tread-band 31 and the felly-band 5 so that the shoe's yielding portion would be at points between the two bands 5 and 31.

The ground-contacting surface of the tread-portion of the shoe may be, and preferably is, formed so as to prevent, so far as possible, any skidding of the vehicle. To this end, I provide said ground-contacting surface with a plurality of cross-grooves 35, each of which is formed with substantially alined side-sections $35^a$ and angular central sections $35^b$ meeting at the central portion of the tread to form a section $35^c$. By this arrangement of the sections of the groove, I provide angulated engaging walls, at least one of which will be at a substantial angle to any sliding movement of the shoe upon the ground, thereby creating a substantial holding instrumentality to prevent slipping and skidding. The portions 36 of the tread-surface between the grooves provide solid and angulated cross-sections. The tread-band 31 tends to maintain these cross-sections in proper engaging position whereby they perform their intended function to prevent slipping and skidding. In the so-called "anti-skidding" surfaced tires now on the market, I have observed that the ridges or projections or raised knobs formed thereon or indentations formed therein augment, rather than prevent, the slipping or skidding, by reason of the fact that they roll or twist, and, instead of presenting abutments to engage the ground, tend rather to present the tire-surface in a condition to slip or skid. By reason of my peculiar construction, no rolling or twisting of the tread-surface is possible. On the contrary, the engaging abutments formed by the cross-sections 36 are constantly maintained in position and condition to prevent slipping or skidding.

By the particular and peculiar relative aggroupment of the components of my construction and the particular manner of connecting them, I have produced a construction which promotes a localization of the yielding capacity of the tire; that is to say, the yielding will, by reason of said aggroupment and connection of the components, be centralized at a desirable point intermediate of the tread and the points of attachment of the shoe to the felly. To this end, I have extended, to an appreciable degree, the width of the tread, and in doing this, I am governed largely by the desire to initially form the same so that it will substantially correspond to the extent that the ordinary tire is flattened out on the tread-surface when in running position. Thus, I increase the air-carrying capacity of the tire, and this results not only from the enlargement of the tread, but also from the particular formation of the base of the shoe. Finally, I so relate the tread and the base and so form the portions of the shoe intermediate of these that the yielding and carrying capacity of the shoe is considerably increased; and, at the same time, by reason of the fact that the line of strain will be substantially on the line $x$—$x$, Fig. 2, the pressure exerted will be equalized at all portions of the tread with reference to the base-portion of the shoe and, by reason of the fact that the portion of the shoe between the tread and the base-portion is particularly constructed to yield, the expanded portion of the tire will at all times be centralized between the tread and the shoe; wherefore three defects now found to exist in present-day structures are obviated, namely, rim-cutting, blow-outs and puncturing. The position and function of the tread-band, with reference to the felly, is such that it causes the line of strain to be at one side of the ends of said band and through the side-walls of the shoe, and against one or another of the above-described surfaces formed on the side of the felly. As a result, the shoe is caused to yield between the surface of the tread-band and that of the felly, and at no point which would be intermediate of the length of said tread-band, this latter element serving to maintain the tread-portion in substantially its normal condition, except in so far as the portion of the tread, being formed of resilient material, yields slightly when in contact with the ground.

From the foregoing, it will be perceived that I have succeeded in devising a pneumatic tire adapted to achieve the several objects and ends in view. The structure is simple, is compact in form, and is particularly well suited for automobile tires.

It will be understood that the language used in the following claims is intended to cover all of the generic and specific features of the invention which, as a matter of language, might be said to fall therebetween.

As many changes can be made in the above construction other than those herein suggested and as many apparently widely different embodiments of this invention can be made without departing from the scope thereof, it is intended that all matter contained in the foregoing description and shown in the accompanying drawings shall be interpreted as illustrative and not in a limiting sense.

Having thus described my invention, what I claim and desire to secure by Letters-Patent is:

1. A tire-securing structure including in combination, a felly formed with a plurality of substantially flat shoe-engaging surfaces arranged in angular relation, some of said surfaces being cut to aline one with the other at opposite sides of the felly and adapted to support the shoe while others converge upwardly and thereby operate to retain it, a felly-band on the felly of less width than the felly and having edges projected beyond the upper surface of the felly, a shoe formed with a base-portion having its innermost surfaces converging toward the felly-band to contact with and be retained by said felly-surfaces and the felly-band, coöperative means mounted on the felly and engaging said base-portion to retain the shoe movably in position; and a spacing and reinforcing element interposed between said means and the projecting edges of the felly-band.

2. A tire-securing structure including in combination, a felly provided with independently-formed bearing and contacting-surfaces cut at an obtuse angle, a shoe having a base formed with a plurality of brace-portions adapted to overlie the felly, with a bearing-portion adapted to engage one of the aforementioned felly-surfaces, and with a contacting-portion arranged at an obtuse angle to the bearing portion and engaging another of the felly-surfaces, means for securing the base-portion to the felly, and a rigid holding-element formed in the shoe-base and disposed between the felly and said securing means.

3. A tire-securing structure including in combination, a felly provided with independently-formed bearing and contacting-surfaces cut at an obtuse angle, a shoe having a base formed with a plurality of brace-portions adapted to overlie the felly, with a bearing-portion engaging one of the aforementioned felly-surfaces, and with a contacting-surface arranged at an obtuse angle corresponding to that of the surfaces of the felly and engaging another of the felly-surfaces, means for securing the base-portion to the felly including a plurality of side-clamping bands and a holding-ring arranged in juxtaposition to one of the clamping-bands and operatively engaging the base-portion of the shoe, and a holding element interposed between the felly and the holding-ring.

4. A tire-securing structure including in combination, a felly formed with bearing surfaces and with shoe-contacting surfaces diagonally disposed with relation to the bearing surfaces, a felly-band adapted to be secured to the felly and having its edges overhanging the diagonal contacting surfaces, a casing-member having a base formed with portions adapted to engage said bearing surfaces and with portions arranged at an obtuse angle to the engaging portions and conforming to that of the felly and adapted to engage said contacting surfaces and also the overhanging portions of the felly-band, means for securing the casing-member to the felly including clamping bands and a retaining ring interposed between each clamping band and the contacting surfaces of the felly, and a spacing strip interposed between each retaining ring and the corresponding overhanging edge of the felly-band.

5. A tire-securing structure including in combination, a felly formed with approximately flat bearing surfaces and with angulated shoe-contacting surfaces, a substantially flat metallic felly-band on the felly and overhanging the contacting surfaces, metallic clamping-bands attached to the felly, a metallic retaining ring connected to each clamping band, a casing member provided with a plurality of contacting surfaces adapted to be attached to the felly and each formed on one side with a recess in which the retaining ring is normally seated, and a protecting element engaging the felly-band.

In testimony whereof I affix my signature in presence of two witnesses.

WILLIAM E. ANDREW.

Witnesses:
A. M. PARKINS,
EDMUND H. PARRY.